United States Patent [19]
Kraus

[11] Patent Number: 5,095,637
[45] Date of Patent: Mar. 17, 1992

[54] MEASUREMENT EMBODIMENT HAVING A MACHINE COMPATIBLE THERMAL EXPANSION

[75] Inventor: Heinz Kraus, Traunreut, Fed. Rep. of Germany

[73] Assignee: Dr. Johannes Heidenhain GmbH, Traunreut, Fed. Rep. of Germany

[21] Appl. No.: 534,682

[22] Filed: Jun. 6, 1990

[30] Foreign Application Priority Data

Jun. 7, 1989 [DE] Fed. Rep. of Germany ....... 3918490

[51] Int. Cl.⁵ .............................................. G01C 15/06
[52] U.S. Cl. ...................................................... 33/702
[58] Field of Search .................. 33/DIG. 19, 700, 701, 33/702, 704

[56] References Cited

U.S. PATENT DOCUMENTS 3,629,945 12/1971 Liuzzo et al. .
3,816,002 6/1974 Wieg .
4,793,049 12/1988 Miller .
4,815,213 3/1989 McCabe et al. ...................... 33/702
4,835,830 6/1989 Miller .

FOREIGN PATENT DOCUMENTS 1176382 8/1964 Fed. Rep. of Germany .
2016253 10/1971 Fed. Rep. of Germany .
7513496 9/1975 Fed. Rep. of Germany .

Primary Examiner—Harry N. Haroian

[57] ABSTRACT

There is provided a measurement embodiment with a resulting thermal expansion which, despite different materials having different thermal expansion coefficients, agrees with the thermal expansion of the machine part so that temperature conditioned measurement inaccuracies are eliminated.

22 Claims, 1 Drawing Sheet

MEASUREMENT EMBODIMENT HAVING A MACHINE COMPATIBLE THERMAL EXPANSION

BACKGROUND OF THE INVENTION

1. Field of the Invention

The present invention is generally directed to a measurement embodiment, and particularly, to a measurement embodiment that eliminates temperature conditioned inaccuracies by creating a resulting thermal expansion equal to the machine part thermal expansion.

2. Description of the Prior Art

A variety of differently constructed measuring embodiments exist. A measurement embodiment consisting of a base body, a graduation carrier and a graduation or scale joined thereto is used in a position measuring arrangement for measuring the relative positions of two objects, for example a machine tool and a workpiece. One object is joined with the measurement embodiment which includes a graduation. A scanning unit attached to the other object scans the graduation of the measurement embodiment. Typically, a graduation carrier is used to join a graduation to a machine part. The graduation is scanned to determine precise movements of the machine.

One problem with attaching a graduation carrier to a machine piece is the change in temperature due to the operating conditions. More specifically, the graduation carrier, usually composed of glass, and the machine piece, usually composed of steel, have different thermal expansion coefficients. The material for the carrier is preferably glass since glass can be produced economically and it has excellent optical properties. The rising temperature during the operation of the machine leads to different dimensional changes of the various components due to the different expansion coefficients. Since the machine piece, the graduation carrier and the graduation will usually not have the same thermal expansion coefficients, the temperature changes resulting from operation leads to inaccuracies in measurement.

There have been various suggestions for correcting the problem. German Utility Model No. 7,513,496 describes a compensating device in which inaccuracies of the machine are compensated. A glass scale is cemented into a hollow aluminum section with a highly elastic layer being placed between the scale and the hollow section. The hollow section is fastened to the machine by means of special end pieces. The highly elastic layer serves to mechanically uncouple the glass scale from the hollow aluminum section. Thus, constraining forces cannot be transmitted from the machine to the glass scale. The compensating device acts on the end faces of the glass scale and can compress or stretch the glass scale in accordance with the requirements of the temperature change. Accordingly, the compensating device adjusts the effective length of the graduation.

In addition, fastening a scale in a measuring device in a floating manner has been known at least since the disclosure in German Patent No. 1,176,382. This method is now considered necessary in order to fasten the highly accurate graduation free of constraining forces. A number of other publications show that it has been considered necessary in the art to uncouple the graduation from the machine, so that no thermally related constraining forces influence the graduation. This view is expressed, for example, in German Offenlegungsschrift No. 2,016,253 and U.S. Pat. Nos. 3,816,002 and 3,629,945.

U.S. Pat. Nos. 4,793,049 and 4,835,830 disclose a measurement embodiment which consists of a base body and a graduation carrier with a graduation applied thereto. The graduation carrier member has a smaller temperature expansion coefficient than the base member. The carrier is placed on the base in a floating manner at normal temperature. Then the carrier and the base are heated. The end faces of the graduation carrier are then fixed by means of fastening elements to the base member in such a way that the graduation carrier member is in a compressed state when cooled to a normal temperature. In order to obtain the correct graduation, however, the graduation marks must be made with increased spacing between marks. The increase in the spacing depends upon the ratio of the temperature coefficients of the base member and the graduation carrier and the magnitude of the desired heating temperature. The production of such a measurement device is expensive.

Accordingly, it is a primary object of the present invention to provide a close linking connection between the graduation carrier and the base body by using a galvanically deposited interlayer.

Another object of the present invention is to provide a measurement embodiment that undergoes the same temperature conditioned length changes as the machine part.

Further objects and advantages will become apparent from the following description and the accompanying drawings.

SUMMARY OF THE INVENTION

The present invention involves a simple method of adapting a graduation carrier and graduation to a machine part having a different thermal expansion coefficient wherein the measurement embodiment has a resulting thermal expansion equal to that of the machine part.

To achieve these objects, there is provided a measurement device with a resulting thermal expansion which, despite different materials, agrees with the thermal expansion of the machine part so that temperature conditioned measurement inaccuracies are avoided.

A galvanically deposited interlayer forms a close linkage between the graduation carrier and the base body. The base body has a larger surface inertia moment than the carrier. The close linkage forces the graduation carrier and the base body to exert force on each other. If the base body has a temperature expansion coefficient equal to that of the machine part, the measurement embodiment is dimensioned so that the graduation carrier undergoes the same temperature related length changes as the base body even though they have different thermal expansion coefficients. If the base body's thermal expansion coefficient is not equal to that of the machine part, the physical dimension of the base body and graduation carrier are selected so that the measurement embodiment will undergo the same length change as the machine part. As explained above, the graduation carrier exerts force on the base body and the base body exerts force on the graduation carrier such that the resultant thermal expansion coefficient of the measurement embodiment is equal to that of the machine part. As a result, the measurement embodiment will have a resulting thermal expansion equivalent to that of the machine part.

This provides an accurate measurement embodiment that is insensitive to the varying thermal expansion coefficients of the graduation carrier, base body and machine part. In addition, the measurement embodiment is economically constructed since the graduation need not be designed to compensate for temperature related effects.

BRIEF DESCRIPTION OF THE DRAWINGS

Further objects and advantages of this invention will become more apparent and readily appreciated from the following detailed description of the present invention, taken in conjunction with the accompanying drawings, of which.

DETAILED DESCRIPTION OF THE PREFERRED EMBODIMENT

The preferred embodiments of the present invention will hereinafter be described in detail with reference to the accompanying drawings.

Figure 1:
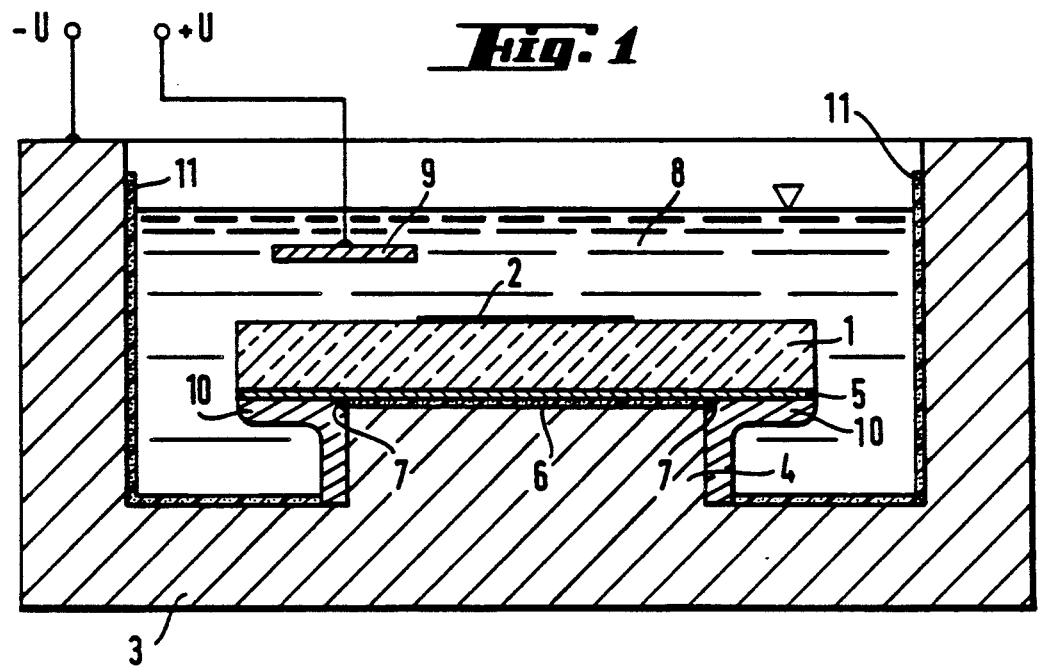
FIG. 1 is a cross-section of a first preferred embodiment in accordance with the present invention.

FIG. 1 is a cross-sectional view of a first preferred embodiment of a measurement embodiment in accordance with the present invention. A glass graduation carrier 1 is provided with a graduation 2 on the graduation carrier's top surface. A base body 3 has a U-shape with a crosspiece 4 in the middle of base body 3. Graduation carrier 1 is attached to base body 3 by crosspiece 4.

The bottom side of graduation carrier 1 has an electrode layer 5 over the carrier's entire bottom surface. Electrode layer 5 serves as an atomic adhesion-mediator. The electrode layer 5 may be, for example, vaporized onto the bottom surface of graduation carrier 1. Electrode layer 5 may be formed of gold, silver or chromium but is not limited to those materials. A suitable thickness for the electrode layer 5 is approximately 1200 nanometers (nm). In order to form a close contact between graduation carrier 1 and electrode layer 5, the bottom surface of carrier 1 can be roughened by matte grinding followed by fine etching with diluted flouric acid.

Carrier 1 and electrode layer 5 are attached to crosspiece 4 by means of an assembly aid 6. Aid 6 is electrically nonconductive. Aid 6 can be a double adhesive bond or an adhesive cement as well as an elastic or rigid adhesive. The present invention, however, is not limited to using an aid 6. Instead, graduation carrier 1 can be held to crosspiece 4 by means of a vacuum suction plate (not shown).

When graduation carrier 1 and electrode layer 5 are joined to crosspiece 4 there are areas on each side of electrode layer 5 to which crosspiece 4 does not extend. Continuously along the abutting edges between free electrode layer 5 and the side surface of crosspiece are conducting lacquer bridges 7. Bridge 7 can be, for example a lacquer or synthetic adhesive with silver filling. Bridge 7 forms an electrically conducting connection between electrode layer 5 and crosspiece 4 and thus base body 3. Bridge 7 can also replace aid 6 if a silver-filled epoxide adhesive is used.

The interior of base body 3 is then filled with an electrolyte 8. Crosspiece 4 and graduation carrier 1 are fully submerged into electrolyte 8. An electrode 9 is then placed into the electrolyte 8. A voltage source (not shown) is connected across electrode 9 and base body 3 such that electrode 9 is connected to the positive pole ($+U$) of the voltage source and the base body 3 is connected to the negative pole ($-U$). When the voltage source is turned on, an interlayer 10 is galvanically deposited. Interlayer 10 forms a close linking connection between the graduation carrier 1 and the base body 3. As will be described later, a close linking connection is required in order for the graduation carrier 1 to undergo the same temperature related length changes as the base body 3. The thickness of interlayer 10 is determined according to the relation of the surface inertia moments of the graduation carrier 1 and the base body 3. The thickness of the interlayer 10 will ensure that the connection between the base body 3 and the graduation carrier 1 allow the carrier 1 to undergo the same length changes as the base body 3. The thickness of interlayer 10 preferably ranges from approximately 0.1 millimeter (mm) to 1 millimeter (mm). Preferably interlayer 10 is composed of copper or nickel but is not limited to these materials. In order to prevent the deposition of metal on the free surfaces of the base body 3, an insulating lacquer layer 11 is applied before the interlayer 10 is formed.

A close linking connection is obtained between the graduation carrier 1 and the base body 3 over the entire length of the measurement embodiment at a reference temperature, for example 20° C. At the reference temperature, the measurement embodiment is homogeneous and tension free. When temperature variations do occur, the graduation carrier 1 and the base body 3 are subject only to elastic deformation which can be readily compensated for.

Graduation 2 can be applied to graduation carrier 1 either before or after the carrier 1 has been joined with the base body 3.

The present invention eliminates the measurement inaccuracies that result from the difference in thermal expansion coefficients of the measurement embodiment and the machine to which it is attached. Base body 3 has a very large surface moment of inertia with respect to the graduation carrier 1. A graduation carrier of glass has a lower thermal expansion coefficient than a steel machine part and an aluminum base body has a greater thermal expansion coefficient than a steel machine part. The galvanically deposited interlayer 10 creates a close linking connection between the graduation carrier 1 and the base body 3. The close linking connection causes the carrier 1 and the base body 3 to exert a mutual interaction on one another. When the temperature increases, the graduation carrier 1 undergoes a greater length increase than it normally would according to its temperature expansion coefficient because of the force exerted by base body 3. Likewise, base body 3 undergoes a smaller length increase than it normally would according to its temperature expansion coefficient because of the force exerted by graduation carrier 1.

For example, if the base body 3 is constructed of steel and it is attached to a steel machine part, the base body 3 will undergo the same temperature related length change as the machine part. The dimensions of the carrier 1 and the base body 3 are chosen such that the base body 3 determines the temperature expansion coefficient of the measuring embodiment. Base body 3 is physically dimensioned so that its surface moment of inertia is much larger than that of the graduation carrier 1. The close linking connection formed by the interlayer 10 ensures that the graduation carrier 1 will undergo the same length changes as the base body 3 and thus the machine part even though the carrier 1 has a different thermal expansion coefficient. The interlayer 10 forces the carrier 1 to undergo the same movement as the base body 3. The result is that the measurement embodiment has a resulting thermal expansion equal to that of the machine part.

If the base body 3 is constructed of aluminum and is attached to a steel machine part, the base body 3 and the graduation carrier 1 will be physically dimensioned so that the measuring embodiment will undergo the same temperature related length changes as the machine part. That is, the size of the base body 3 and the graduation carrier 1 are chosen such that the measuring embodiment will undergo the same temperature related length changes as the machine part. In essence the reference frame is constantly adjusted so that the measurements are always accurate. The base body 3 and the graduation carrier 1 are physically dimensioned so that the base body 3 raises the thermal expansion coefficient of the steel machine part and the graduation carrier 1 lowers the thermal expansion coefficient of the base body 3. The result is that the measuring embodiment has a resulting thermal expansion coefficient equal to the machine's thermal expansion coefficient. The result is a measurement embodiment having a resulting thermal expansion equal to that of the machine part.

Figure 2:
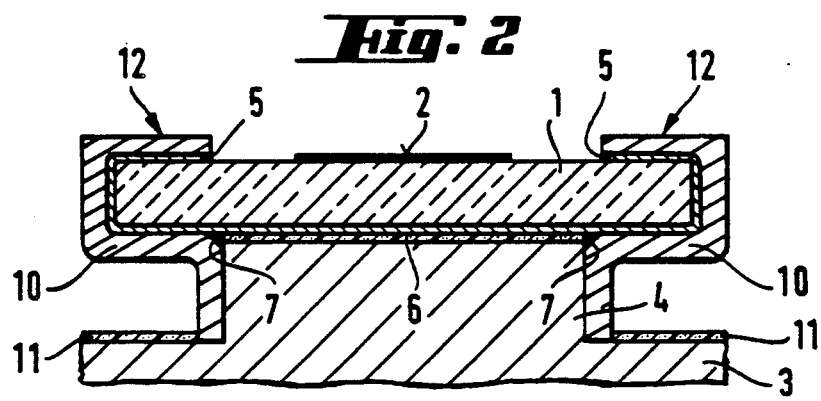
FIG. 2 is cut out of FIG. 1 illustrating a second preferred embodiment in accordance with the present invention.

FIG. 2 illustrates a cut out of FIG. 1 illustrating a second preferred embodiment in accordance with the present invention. Electrode layer 5 is formed on the bottom surface of carrier 1 as well as its side surfaces and a portion of the carrier's top surface called the border zones 12. The galvanically deposited interlayer 10 is formed over the entire electrode layer 5 and thus extends into the narrow border zones 12. After fine-processing the interlayer 10 in the two border zones 12, the border zones 12 can serve as running surfaces for a scanning unit (not shown) to scan the graduation 2.

Figure 3:
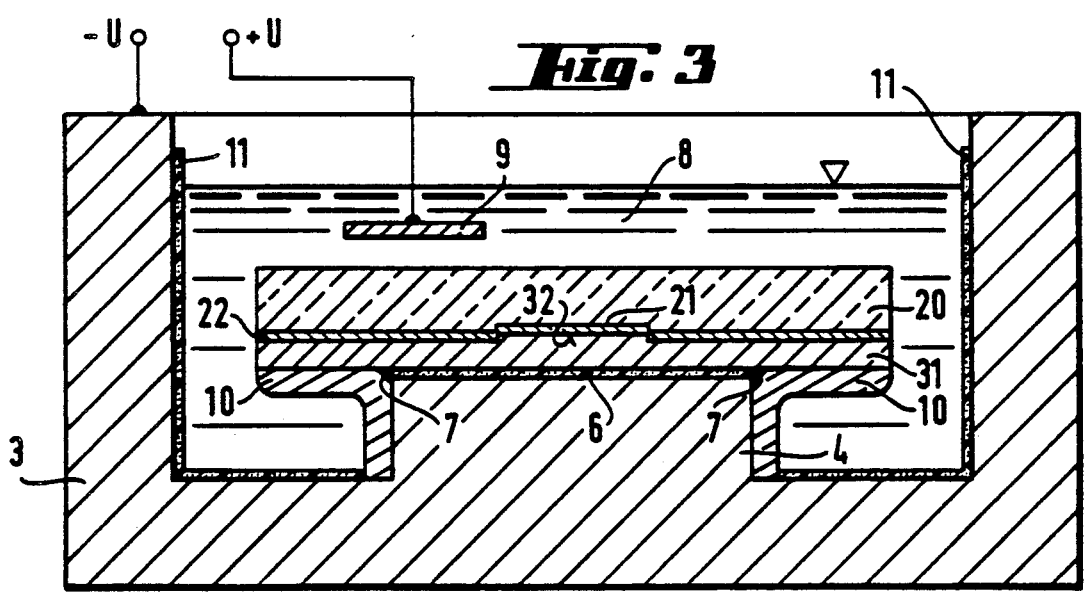
FIG. 3 is a cross-section of a third preferred embodiment in accordance with the present invention.

FIG. 3 illustrates a cross-section of a third preferred embodiment of the present invention. Elements that are identical with those in FIGS. 1 and 2 will have the same reference numerals. A glass graduation matrix 20 is provided having a graduation 21 applied to its bottom surface. An electrode layer 22 is then applied to the graduation 21. Electrode layer 22 also serves simultaneously as a separating layer. Electrode layer 22 may be formed by vaporizing silver in a high vacuum to a thickness of approximately 50-100 nanometer (nm).

On the electrode layer 22 there is generated a graduation carrier 31 and a graduation 32 in the form of a galvanic molding layer. Preferably graduation carrier 31 is copper or nickel. As described above in reference to FIGS. 1 and 2, graduation carrier 31 and graduation 32 are joined to cross-section 4 in the same manner described above.

After formation of graduation carrier 31 and graduation 32, graduation matrix 20 and electrode layer 22 are removed and can be used for the production of other graduation carriers. As already described above, the measurement embodiment undergoes a resulting thermal expansion equal to that of the machine part and thus temperature related measurement errors are eliminated.

While this invention has been shown and described in connection with preferred embodiments, it is apparent that certain changes and modifications, in addition to those mentioned above, may be made from the basic features of the present invention. Accordingly, it is the intention of the Applicant to protect all variations and modifications within the true spirit and valid scope of the invention.

What is claimed is:

1. A measurement embodiment having a resulting thermal expansion equivalent to a machine part to which it is to be attached comprising:
   a base body;
   a graduation carrier with a graduation applied thereto wherein said carrier has a different thermal expansion coefficient than said base body; and
   means for closely linking said graduation carrier to said base body wherein said means for closely linking said graduation carrier to said base body comprises a galvanically deposited interlayer.

2. A measurement embodiment according to claim 2 wherein said interlayer can vary in thickness from approximately 0.1 millimeter (mm) through 1 millimeter (mm) in order to create a close linkage between said carrier and said base body.

3. A measurement embodiment according to claim 2 wherein said graduation carrier is glass.

4. A measurement embodiment according to claim 2 wherein said graduation carrier is a galvanic molding layer formed from a graduation matrix.

5. A measurement embodiment according to claim 4 wherein said graduation carrier is copper or nickel.

6. A measurement embodiment according to claim 2 wherein said base body is steel.

7. A measurement embodiment according to claim 2 wherein said interlayer is copper or nickel.

8. A measurement embodiment according to claim 2 wherein said base body has a U-shape cross section.

9. A measurement embodiment according to claim 2 wherein said interlayer provides a running surface for a scanning unit.

10. A measurement embodiment according to claim 2 wherein said means for closely linking said graduation carrier to said base body forces said graduation carrier to undergo the same temperature related length change as said base body.

11. A measurement embodiment according to claim 1 wherein said means for closely linking said graduation carrier to said base body rigidly links said graduation carrier to said base body.

12. Method of producing a measurement embodiment having a resulting thermal expansion equivalent to a machine part to which it will be attached comprising the steps of:
   applying an electrically conducting electrode layer to a bottom surface of a graduation carrier;
   attaching said bottom surface of said graduation carrier to a base body; and
   forming a galvanically deposited interlayer to closely link said graduation carrier to said base body such that said graduation carrier will undergo the same temperature related length changes as said base body.

13. Method of producing a measurement embodiment comprising the steps of:
   applying an electrode layer to a bottom surface of a graduation matrix having a graduation located on said bottom surface;
   generating a graduation carrier and a second graduation as a galvanic molding layer to said electrode layer on said bottom surface of said graduation matrix;

joining said graduation carrier and said second graduation to said base body such that said graduation carrier is in contact with said body base;

forming a galvanically deposited interlayer to closely link said graduation carrier to said base body; and removing said graduation matrix and said electrode layer from said graduation carrier and said second graduation.

14. A measurement embodiment comprising:

a base body;

a graduation carrier with a graduation applied thereto wherein said graduation carrier has a different thermal expansion coefficient than said base body; and means for closely linking said graduation carrier to said base body wherein said carrier exerts constraining forces on said base body and said base body exerts expanding forces on said carrier so that said measurement embodiment has a resulting thermal expansion coefficient equivalent to that of the machine part wherein said means for exerting force on said carrier comprises a galvanically deposited interlayer closely linking said carrier and said base body.

15. A measurement embodiment according to claim 14 wherein said graduation carrier is glass.

16. A measurement embodiment according to claim 14 wherein said graduation carrier is a galvanic molding layer formed from a graduation matrix.

17. A measurement embodiment according to claim 15 wherein said graduation carrier is copper or nickel.

18. A measurement embodiment according to claim 15 wherein said base body is steel.

19. A measurement embodiment according to claim 15 wherein said interlayer is copper or nickel.

20. A measurement embodiment according to claim 15 wherein said base body has a U-shape cross section.

21. A measurement embodiment according to claim 15 wherein said interlayer provides a running surface for a scanning unit.

22. A measurement embodiment which is to be attached to a machine part comprising:

a base body:

a graduation carrier with a graduation applied thereto wherein said carrier has a different thermal expansion coefficient than said base body; and means for closely linking said graduation carrier to said base body wherein said means for closely linking said graduation carrier to said base body comprises a galvanically deposited interlayer and wherein the size (cross-sections) of the graduation carrier and the base body are chosen such that said measuring embodiment has a resulting thermal expansion coefficient equivalent to that of the machine part.

* * * * *

UNITED STATES PATENT AND TRADEMARK OFFICE
CERTIFICATE OF CORRECTION

PATENT NO. : 5,095,637

DATED : March 17, 1992

INVENTOR(S) : Heinz Kraus

It is certified that error appears in the above-identified patent and that said Letters Patent is hereby corrected as shown below:

On title page, item [30]

<u>IN THE FOREIGN APPLICATION PRIORITY DATA</u> delete "3918490" should read --P3918490--

In column 1, line 8, before "Field" delete "1.".
In column 1, line 14, before "Description" delete "2.".

In column 3, line 45, delete "1200" and substitute therefor --100--.

In column 3, line 48, delete "flouric" and substitute therefor --fluoric--.

In column 3, line 62, after "crosspiece" insert --4--.

In column 4, line 10, after "forms" delete ",".

Column 6,

In claims 2, 3, 4, 6, 7, 8, 9, and 10, line 1, after "claim" delete "2" and substitute therefor --1--.

UNITED STATES PATENT AND TRADEMARK OFFICE
CERTIFICATE OF CORRECTION

PATENT NO. : 5,095,637

DATED : March 17, 1992

INVENTOR(S) : Heinz Kraus

It is certified that error appears in the above-identified patent and that said Letters Patent is hereby corrected as shown below:

Column 8,

In claims 17, 18, 19, 20, and 21, line 2, before "wherein" delete "15" and substitute therefor --14--.

Col. 8, line 17, after "body" delete ":" and substitute therefor --;--.

Signed and Sealed this

Twelfth Day of April, 1994

BRUCE LEHMAN

*Attest:*

*Attesting Officer*

*Commissioner of Patents and Trademarks*